July 4, 1950     A. D. HILL     2,513,868
TRACTOR STEERING APPARATUS

Filed July 13, 1946     4 Sheets-Sheet 1

INVENTOR.
ARLIE D. HILL
BY
A.B. Bowman
ATTORNEY

July 4, 1950          A. D. HILL          2,513,868
TRACTOR STEERING APPARATUS
Filed July 13, 1946          4 Sheets-Sheet 2
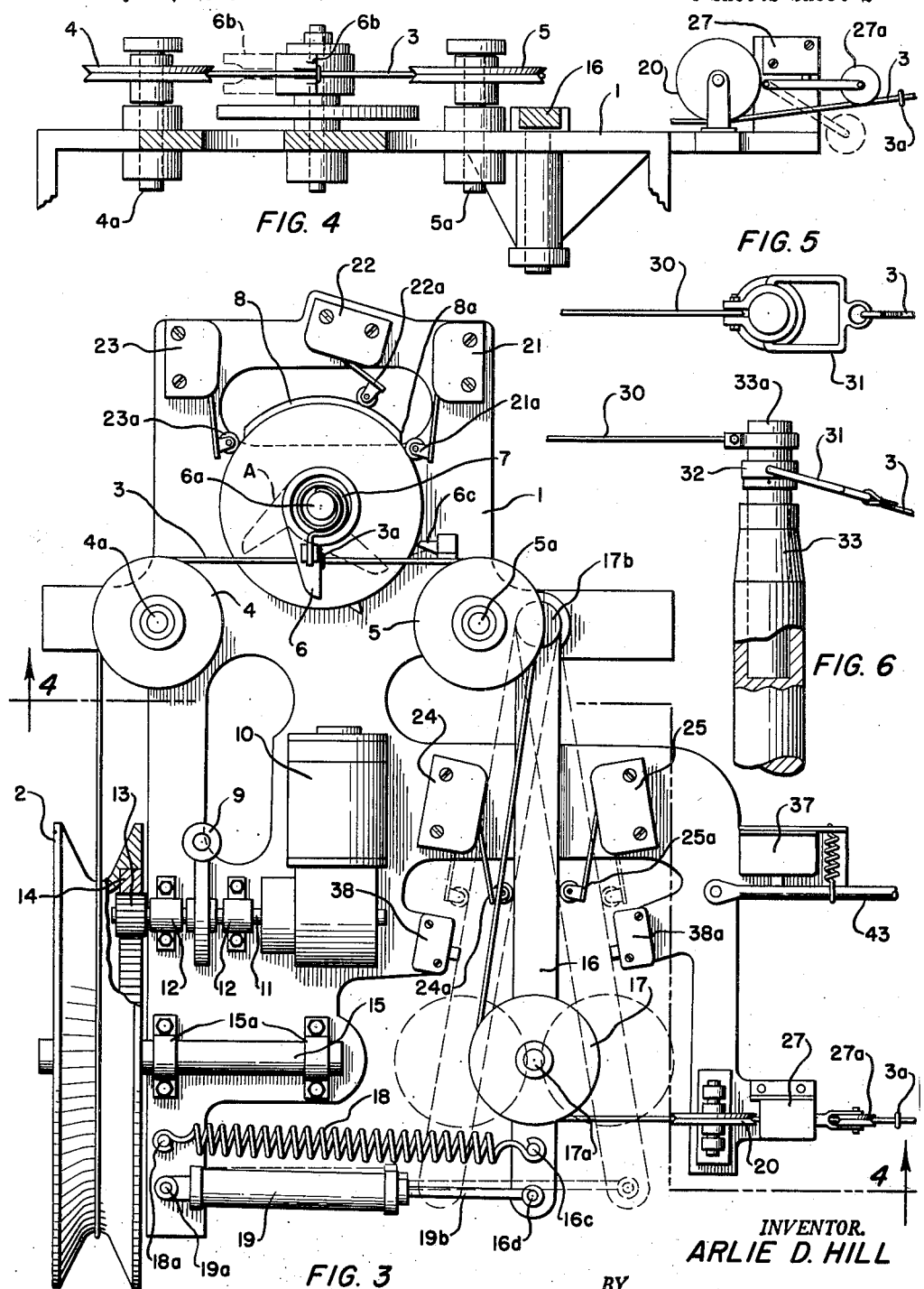
INVENTOR.
ARLIE D. HILL
BY
A. B. Bowman
ATTORNEY INVENTOR.
ARLIE D. HILL
BY
A.B.Bowman
ATTORNEY July 4, 1950  A. D. HILL  2,513,868
TRACTOR STEERING APPARATUS
Filed July 13, 1946  4 Sheets-Sheet 4
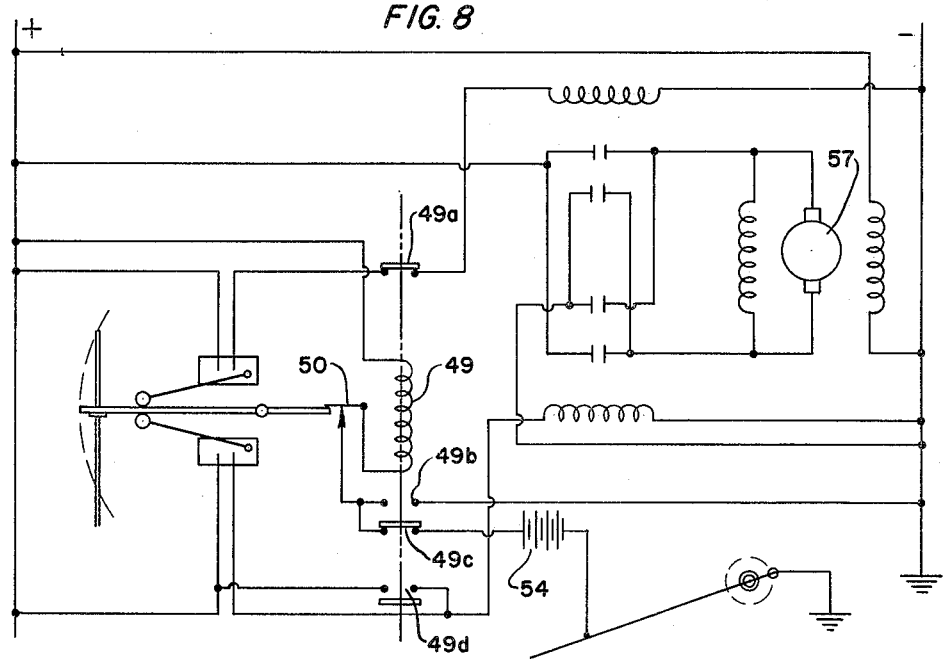
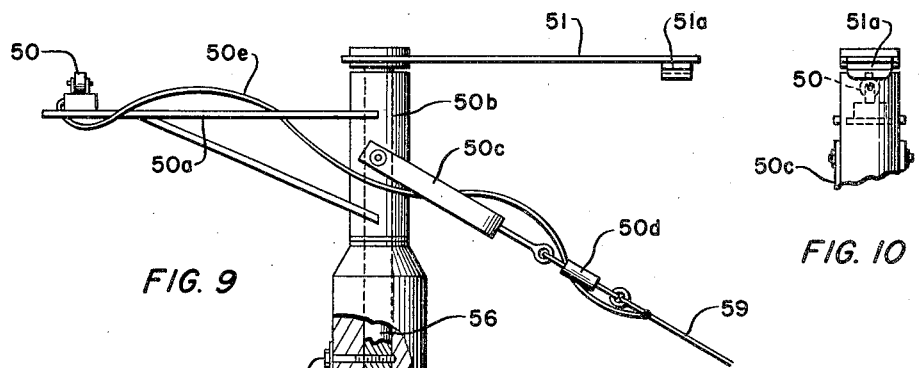
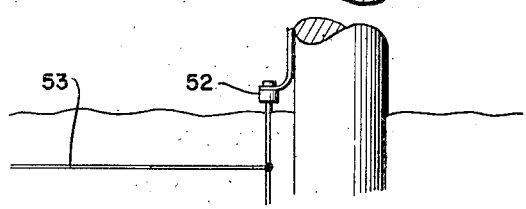
INVENTOR.
ARLIE D. HILL
BY
A. B. Bowman
ATTORNEY Patented July 4, 1950

2,513,868

UNITED STATES PATENT OFFICE 2,513,868

TRACTOR STEERING APPARATUS

Arlie D. Hill, Lakeside, Calif.

Application July 13, 1946, Serial No. 683,364

14 Claims. (Cl. 180—79.1)

My invention relates to a tractor steering apparatus, more particularly for use in steering the tractor automatically without manual aid, and the objects of my invention are:

First, to provide a tractor steering apparatus of this class, which controls the operating path of a tractor accurately enough for use in field plowing and row crop cultivation;

Second, to provide a tractor steering apparatus of this class which is entirely automatic after having been properly started so that the tractor controlled by my tractor steering apparatus may be left unattended throughout the operating range of the tractor;

Third, to provide a tractor steering apparatus of this class incorporating certain control features which automatically stop operation of the tractor in case various injurious operating conditions become apparent in the cooling or lubricating systems of the tractor engine;

Fourth, to provide a tractor steering apparatus of this class which incorporates control mechanism for sounding an alarm when the tractor stops so that the tractor may be given immediate attention and started again;

Fifth, to provide a tractor steering apparatus of this class which is very safe and positive in operation, whereby the tractor is prevented from deviating from a predetermined path and ruining row crops under cultivation;

Sixth, to provide a tractor steering apparatus of this class which may be used in several different fields by simply making a single control cable connection of the tractor with a field center pole; and Seventh, to provide a tractor steering apparatus of this class which is very simple and economical of construction in accordance to its utility, efficient in its action, and which will not readily deteriorate or get out of order.

Figure 1:
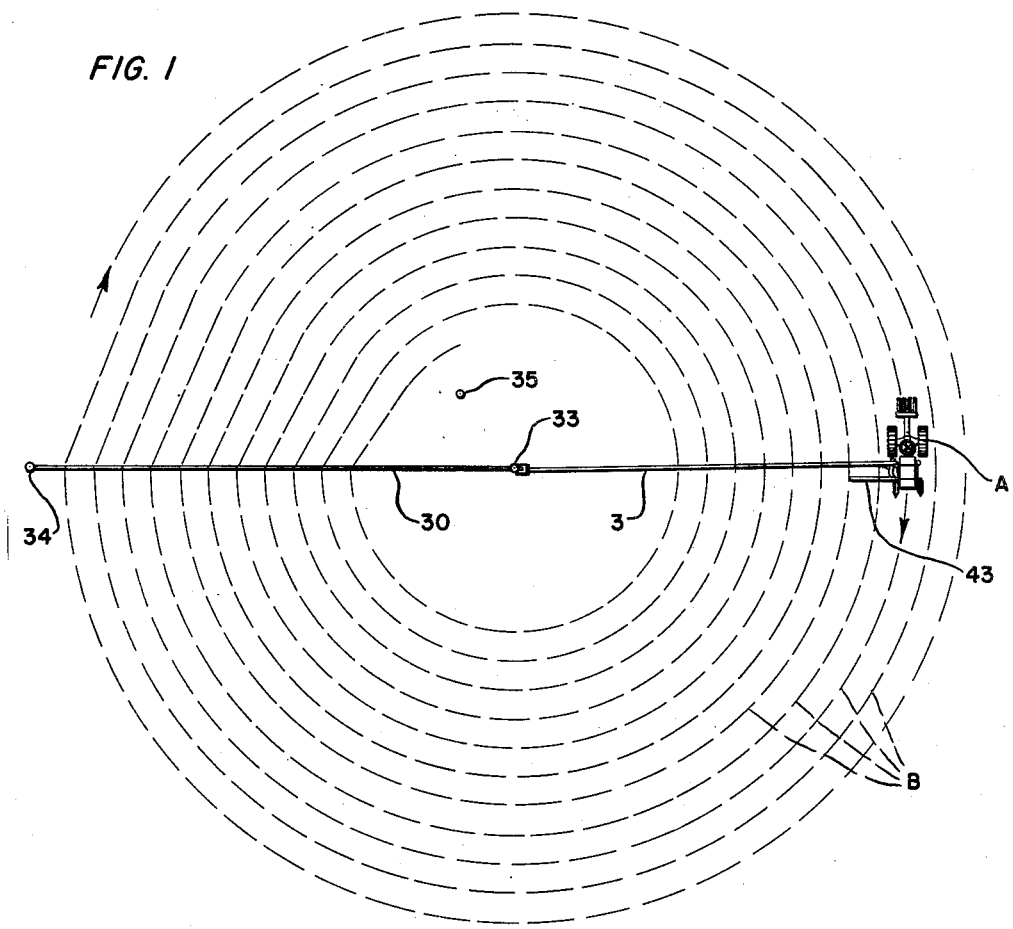
Figure 2:
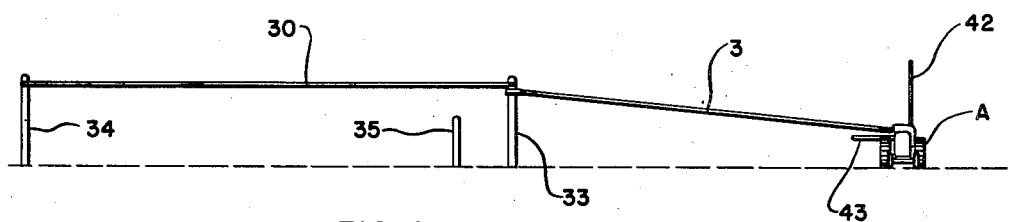
Figure 7:
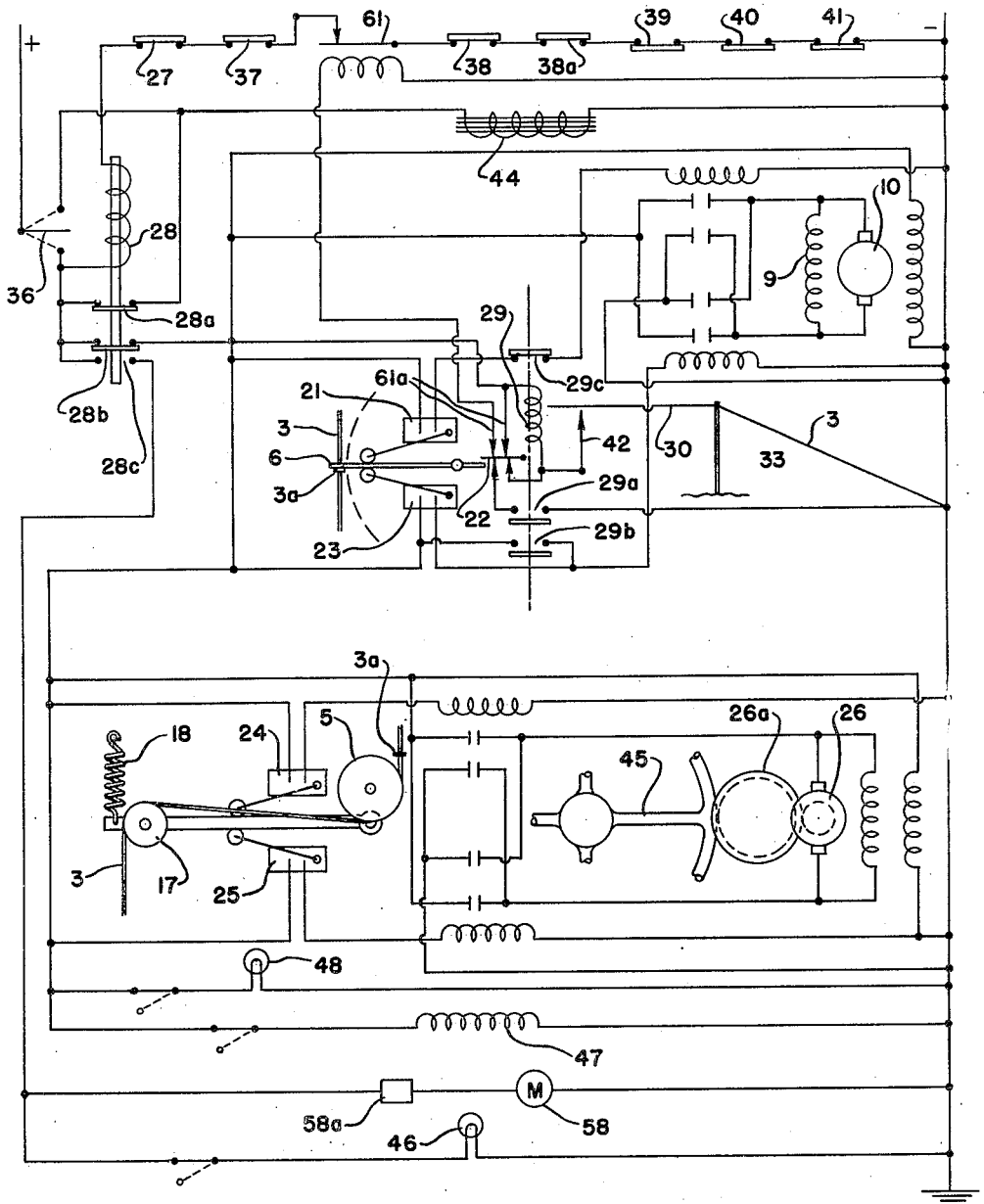

With these and other objects in view as will appear hereinafter, my invention consists of certain novel features of construction, combination and arrangement of parts and portions and a certain modification, as will be hereinafter described in detail and particularly set forth in the appended claims, reference being had to the accompanying drawings and to the characters of reference thereon, forming a part of this application, in which:

Figure 1 is a plan view of my tractor steering apparatus shown in connection with a tractor and illustrating by dash lines the path of the tractor in field work; Fig. 2 is a side elevational view of my tractor steering apparatus, shown in connection with a tractor; Fig. 3 is a top or plan view of the operating mechanism of my tractor steering apparatus showing portions broken away and in section to amplify the illustration and showing varying positions of parts thereof by dash lines; Fig. 4 is a fragmentary sectional view taken from the line 4—4 of Fig. 3; Fig. 5 is a top or plan view of the field center pole of my tractor steering apparatus; Fig. 6 is a side elevational view of the center pole of my tractor steering apparatus; Fig. 7 is a diagrammatic view of the electrical wiring of my tractor steering apparatus; Fig. 8 is a diagrammatic view of the wiring of a modified form of my tractor steering apparatus; Fig. 9 is a fragmentary side elevational view of a modified form of center pole of my tractor steering apparatus showing portions broken away and in section to amplify the illustration; and Fig. 10 is a fragmentary side elevational view of the center pole as shown in Fig. 9 of the drawings taken substantially 90° from the view as shown in Fig. 9 of the drawings.

Similar characters of reference refer to similar parts and portions throughout the several views of the drawings.

The frame 1, cable reel 2, control cable 3, pulleys 4 and 5, pawl 6, spring 7, cam 8, magnetic brake 9, reversible reduction gear motor 10, shaft 11, bearings 12, pinion gear 13, ring gear 14, shaft 15, arm 16, pulley 17, spring 18, snubber 19, pulley 20, switches 21, 22, 23, 24, and 25, reversible reduction gear motor 26, safety switch 27, relays 28 and 29, jog wire 30, yoke 31, slip ring 32, center pole 33, jog wire pole 34, inner field switch pole 35, switches 36, 37, 38, 39, 40 and 41, aerial 42, and switch arm 43 constitute the principal parts and portions of my tractor steering apparatus.

The frame 1 is a flat plate-like member, forming a rigid mounting for the operating mechanism of my tractor steering apparatus and this frame 1 may be secured in connection with a conventional tractor A, as shown in Figs. 1 and 2 of the drawings. The cable reel 2 is secured to the shaft 15 journaled in bearings 15a, mounted on the frame 1, as shown best in Fig. 3 of the drawings. This cable reel 2 is provided with an internally mounted ring gear 14 in mesh with the pinion gear 13, on the shaft 11, journaled in bearings 12, secured to the frame 1. Connected with the opposite end of the shaft 11, from the pinion gear 13 is the reversible reduction gear motor 10. The magnetic brake 9 is mounted on the shaft 11, intermediate the bearings 12, and is a conventional magnetic brake. The control cable 3 is secured at its one end, in connection with the cable reel 2, and is secured at its opposite end to the yoke 31, pivotally connected to the slip ring 32, which is revolubly mounted on the center pole 33, as shown best in Fig. 6 of the drawings. This control cable 3 is provided with rings 3a, fixed thereon in spaced relation to each other, corresponding to the distances between the concentric rows B, as indicated by dash lines in Fig. 1 of the drawings. The rows B are arranged in substantially concentric relation, in spaced relation to each other, on the field being cultivated or worked by the tractor A. The control cable 3 passes from the cable reel 2 over the pulleys 4 and 5 which are revolubly mounted on pins 4a and 5a respectively, fixed to the frame 1. The control cable 3 also passes over the pulley 17, which is revolubly mounted on an extending pin 17a, fixed to the arm 16, which is pivotally mounted on the pin 17b fixed to the frame 1. The spring 18 is secured to the frame by means of a pin 18a at its one end and is secured at its opposite end to the arm 16 by means of a pin 16c. This spring 18 is a tension spring and tends to pull the arm 16 toward the cable reel 2. The snubber 19 is pivotally mounted on a pin 19a, fixed to the frame 1 and is provided with a plunger 19b pivotally connected to the arm 16 by a pin 16d, all as shown best in Fig. 3 of the drawings. The switches 24 and 25 are adjustably fixed in connection with the frame 1 and are provided with roller actuator arms 24a and 25a, engaging opposite edges of the arm 16. The pulley 20 supports the control cable 3 outwardly of the arm 16. The safety switch 27 mounted on the frame 1, adjacent the pulley 20 is provided with a following roller 27a engaging the control cable 3. The pawl 6 and cam 8 are secured in fixed relation to each other and are revolubly mounted on a pin 6a fixed to the frame 1. The pawl 6 is engaged by a spiral spring 7 which is fixed at its opposite end to the pin 6a, tending to rotate the pawl 6 together with the cam 8 in a counterclockwise direction, as shown in Fig. 3 of the drawings. The cam 8 is arranged to engage the roller actuating arms 21a, 22a and 23a of the switches 21, 22 and 23, as shown in Fig. 3 of the drawings. It will be noted that the pawl 6 is provided with spaced arm portions 6b, intermediate which the cable 3 passes, as shown in Fig. 4 of the drawings. The pawl 6 is arranged to interrupt the passage of the cable 3 when engaged by the fixed rings 3a thereon, as shown best in Figs. 3 and 4 of the drawings. Mounted on the tractor A is an aerial 42 of sufficient altitude to contact the jog wire 30 at each passage of the tractor A thereunder. The inner field switch pole 35 is positioned near the middle of the field, a short distance from the center pole 33 and is arranged to be contacted by the switch arm 43, pivotally mounted on the tractor and arranged to actuate the switch 36, as shown in the wiring diagram Fig. 7 of the drawings. Contact of the switch arm 43 with the inner field switch pole 35 opens the tractor ignition circuit and stops the tractor at the inner field position near the inner field switch pole 35.

It will be here noted that the center pole 33 is provided with a post 33a of electrical conducting material to which the jog wire 30 and control cable 3 are electrically connected.

As shown in Fig. 7, the safety switch 36 is arranged in circuit with the relay 28 and the tractor ignition coil 44. When the switch 36 is manually set in electrical connection with the tractor ignition coil 44, the tractor is manually steered and controlled. When the safety switch 36 is closed and conducting electrically to the relay 28, the contacts 28a and 28b are closed, providing a complete circuit to the tractor ignition coil 44 and the reversible reduction gear motor 10, together with the switches 21, 22 and 23 for controlling the reeling in of the control cable 3. The switches 27, 37, 38, 39, 40 and 41 are connected in series, intermediate the negative side of the circuit and the relay 28, and these switches are safety switches which perform the following functions:

The switch 37 is actuated by contact of the switch arm 43 with the iner field pole 35 for stopping the tractor at the inner field position. The switch 27, as shown in Fig. 3 of the drawings, is a normally open switch and is maintained in closed condition by proper tension of the cable 3, which when relaxed opens the contacts of the switch 27. It will be noted that angular lead of the control cable from the pulley 20, permits the contact roller 27a of the switch 27 to shift and open the switch contact which deenergizes the relay 28 and the engine ignition coil 44. The relay 28 is arranged to open with a low voltage condition in the electrical system of the tractor steering apparatus. The switch 39 operates in connection with the oil pressure of the tractor engine and opens when the pressure of the oil in the tractor engine becomes dangerously low. The switch 40 opens when the temperature of the engine lubricating oil of the tractor becomes dangerously high. The switch 41 opens when the cooling water in the tractor engine reaches a dangerously high temperature. Thus, any one of the switches 27, 37, 38, 39, 40 and 41, when opened, de-energize the relay 28 and engine ignition coil 44, stopping operation of the tractor. The reversible reduction gear motor 26, as shown in Fig. 7 of the drawings, is provided with a frictional drive wheel 26a, contacting the periphery of the tractor steering wheel 45, which is a conventional steering wheel connected with the conventional tractor steering mechanism.

The operation of my tractor steering apparatus is substantially as follows:

When the control cable 3 is connected with the center pole 33, as shown in Fig. 1 of the drawings, and is properly threaded through the pulleys 4, 5 and 17, together with the pulley 20 and the roller 27a of the switch 27, as shown in Fig. 3 of the drawings, automatic operation takes place in the following manner:

In order to initiate automatic operation of my tractor steering apparatus, the tractor A is manually steered to the left until proper tension of the control cable 3 results, then the switch 36, as shown in Fig. 7 of the drawings, is shifted into direct communicative relation with the positive side of the circuit and the relay 28. As the tractor proceeds about the center pole 33 on a radius equal to the played out length of the control cable 3, deviation of the tractor to the left, causes the control arm 16 to be shifted to the right, closing the switch 25, causing the motor 26, as shown in Fig. 7 of the drawings, to steer the tractor to the right. If the tractor moves to the right of the predetermined path, the spring 18 takes up the slack in the control cable 3 and moves the control arm 16 to the left, closing the switch 24 and energizing the motor 26 in the reverse direction, steering the tractor to the left. It will be noted that the switches 24 and 25 are laterally adjustable, relatively to the arm 16 to prevent oversteering due to limited tolerance. During the steering operations of the steering arm 16, switches 24 and 25 and the motor 26, the cable reel 2 holds the cable 3 in fixed position and the cable reel 2 is maintained against rotation by the magnetic brake 9, which is a holding brake, as shown in Fig. 7, in circuit with the motor 10, automatically released and set with the starting and stopping of the motor 10 in either rotational direction. If either of the switches 24 or 25, or any other equipment of the steering assembly should fail, the tractor would either deviate to the left and break the cable 3 or would deviate to the right and cause slack therein. In either case the roller 27a of the switch 27 would move to the dash line position under spring tension and open the circuit to the relay 28, which is a spring loaded relay and this relay 28 would open the contacts 28a and de-energize the tractor engine ignition coil 44 and stop the tractor. Each time the tractor A completes a turn around the field, it passes under the jog wire 30. The aerial 42, which is insulated from the tractor and in circuit with the relay 29, engages the jog wire 30, as shown in Figs. 2 and 7 of the drawings, which completes the circuit to the relay 29, energizing the same, which closes the contacts 29a and 29b. When the contacts 29a are closed, the circuit to the relay 29 is maintained and during the time the relay 29 is energized, the contacts 29c are held open. These contacts 29c in open position, prevent the motor 10 from reeling out cable in connection with the cable reel 2, which would normally be caused by closing of the switch 21, in connection with the cam 8, when the contacts 29b are closed by the relay 29, starting the reeling in of the cable 3, all as shown best in Fig. 7 of the drawings. When the relay 29 is operated, the contacts 29c are opened and the contacts 29a and 29b are closed. Thus, the circuit is completed to the motor 10 for reeling in the cable on the cable reel 2 and as the cable 3 passes toward the reel 2, over the pulleys 4 and 5, the ring contacting the pawl 6 forces said pawl 6 to the left, as shown in Fig. 3 of the drawings, causing the cam 8 to shift to the right and engage the roller 21a, closing the switch 21. This switch 21 normally operates to reel out cable by energizing the motor 10 in the reverse direction of the switch 23. However, the open contacts 29c prevent the motor 10 from being energized in the direction for reeling out cable from the cable reel 2. Thus, the motor is maintained in the reverse operation for reeling in cable on the cable reel 2 by means of the completed circuit through the contacts 29b. After the ring 3a has passed the pawl 6 and slipped beyond the ends of the jaws 6b of the pawl 6, the spring 7 returns the pawl 6 into engagement with the stop 6c, as shown in Fig. 3 of the drawings, whereupon the roller 22a of the switch 22 passes off the end portion 8a of the cam 8 opening the switch 22, as shown in Fig. 7 of the drawings, de-energizing the relay 29, which is a spring loaded relay, causing the contacts 29c to be closed and the contacts 29a and 29b to open. During the reeling in of the cable 3, which is initiated by contact of the aerial 42 with the jog wire 30, additional tension is applied to the cable 3 which causes the arm 16 to be shifted to the right. Shifting of the arm 16 to the right closes the contacts of the switch 25 which energizes the motor 26 and operates the steering wheel 45 of the tractor, causing the same to be steered to the right. The tractor continues to steer to the right until the cable is sufficiently reeled in to contact another of the rings 3a with the pawl 6 which rests adjacent the stop 6c. When the next ring 3a engages the pawl 6 and moves the same to the solid line position, as shown in Fig. 3 of the drawings, the cam 8 releases the switch 23 and opens the same, stopping the reeling in of cable. When the reel 2 ceases to reel in the control cable 3, normal tension of the cable 3 is then effected by the spring 18 which resists movement of the control arm 16. Normal steering is then again continued by the switches 24 and 25 operating in connection with the control arm 16. It will be here noted that the release of the pawl 6 by the ring 3a passing the same, causes the cam 8 to close the switch 23 before opening the switch 22, thereby maintaining the energization of the motor 10 for continued reeling in of the control cable 3 until the next adjacent ring on the control cable 3 returns the pawl 6 and the cam 8 to the position as shown in Fig. 3 of the drawings, whereupon the switch 23 is again opened, due to relief thereof from the cam 8. As shown in Fig. 7 of the drawings, the circuit to the relay 29 is completed by contact of the aerial 42 with the jog wire 30. This jog wire 30 is electrically connected with the control cable 3 at the center pole 33. The control cable 3, in contact with the pulleys 4, 5, and 17 is grounded to the tractor. The switches 27, 37, 38, 39, 40 and 41 provide for the safe operation of the tractor controlled by my tractor steering apparatus. Any one of these switches in open position causes the circuit to the relay 28 to be opened whereupon the spring loaded relay plunger opens the contacts 28a and 28b. As the contacts 28a are opened, the ignition coil 44 of the tractor engine is de-energized, stopping operation of the tractor. The bridge relieved from the contacts 28b, closes the contacts 28c, in circuit with the horn motor 58, which sounds an alarm for a certain length of time which is terminated by operation of the heater switch 58a in circuit therewith. The light 46 is turned on with the closing of the contacts 28c for indicating the position of the tractor in the field when operating at night. The holding coil 47 is for use in retaining a spring loaded firing pin for a conventional shotgun alarm which is also used to signal the inoperative condition of the tractor. In circuit with the steering motor 26 is the normal operation indicating light 48. This light 48 may be trained toward the center pole 33 and indicates a normal operating condition of the tractor when in operation at night. The holding coil 47 is also in circuit with the steering motor 26, and this holding coil 47 is de-energized by the opening of the contacts 28b permitting the firing pin of the shotgun alarm to ignite the shotgun cartridge for signalling the caretaker of the tractor controlled by my tractor steering apparatus.

It will be here noted that switches 21 and 23, engageable with the cam 8 cause operation of the reel motor 10 in the opposite direction for maintaining the pawl 6 in the position as shown in Fig. 3 of the drawings. If the reel 2 overtravels its position, carrying the pawl 6 and cam 8 toward the dash line position A, the switch roller 21a is engaged by the cam 8 causing the reel motor 10 to reel out the control cable 3, which is taken up by tension of the control cable 3. Thus, if the pawl 6 is out of position in either direction, either of the switches 21 or 23, engaged by the cam 8 will cause repositioning of the pawl 6, thus maintaining absolute fixed position of the ring portions 3a relatively to the tractor during each turn thereof about the field. The heater switch 61 in circuit with the switch 22, as shown in Fig. 7 of the drawings is arranged to open after a predetermined length of time, causing the relay 28 to be de-energized, which opens the circuit to the ignition coil 44, stopping operation of the tractor.

The spacing of the control rings 3a, on the control cable 3 are made from actual measurement under operating conditions, with the control cable under working tension. A separate measurement is made for each row division along the ground base line of the right-angle triangle formed by this line, the center pole altitude line, and the control cable hypotenuse line. The deviation of angle between the control cable line and the ground line, and the sag of the control cable is thereby compensated for.

In the modified structure as shown in Figs. 8, 9, and 10 of the drawings, the center pole 55 is placed in the same position as the center pole 33, shown in Fig. 1 of the drawings. The control cable 59 is similar to the control cable 3 shown in Fig. 1 of the drawings. The control cable 59 is connected by an insulator 50d to a bracket 50c in connection with the rotating sleeve 50b of the switch contact 50, supported on the arm 50a in connection with the sleeve 50b. This contact 50 is connected by a conductor 50e with the control cable 59, all as shown best in Fig. 9 of the drawings. The rotating sleeve 50b is rotatably mounted on an electrical conductor 56 secured in connection with the center pole 55. Electrically connected to the conductor 56 is an electrical conductor arm 51 having a contact 51a in fixed radial position relatively to the center pole 55. The conductor cable 60 is connected with the conductor 56 by the bolt 60a at its one end and connected to the ground rod 52 at its opposite end to which is connected the ground conductor 53. This ground conductor 53 is extended radially under the surface of the ground of the field to conduct the electrical ground, radially to the tractor, in the earth. This radially extending conductor 53 is especially essential in dry ground.

The operation of the modification, as shown in Figs. 8, 9 and 10 of the drawings, is substantially as follows:

When the tractor, as shown in Fig. 1 of the drawings, makes a complete turn around the field, the contact 50 engages the contact 51a and completes the circuit to the ground through the control cable 59, electrical conductor 50e, electrical conductor 56, cable 60 and ground conductor 53. The booster battery 54, as shown in Fig. 8 of the drawings, provides an additional current supply for the ground conductor 53. The general operation of the relay 49, together with the contacts 49a, 49b, and 49c, is similar to the operation of the relay 29, together with the contacts 29c, 29a and 29b respectively, all as shown best in Fig. 8 of the drawings. The remainder of the tractor steering apparatus, shown in Figs. 1 to 7 of the drawings, cooperates with the modification shown in Figs. 8, 9 and 10 of the drawings. The motor 57, as shown in Fig. 8 of the drawings, corresponds to the motor 10, as shown in Fig. 7 of the drawings.

It will be noted that the collar 50b rotates about the conductor shaft 56 and that the bracket 50c permits various angular disposition of the control cable 59 insulated therefrom by the insulator 50d.

Though I have shown and described a particular construction, combination and arrangement of parts and portions, and a certain modification, I do not wish to be limited to the particular construction, combination and arrangement nor to the modification, but desire to include in the scope of my invention, the construction, combination, and arrangement substantially as set forth in the appended claims.

Having thus described my invention, what I claim as new and desire to secure by Letters Patent is:

1. In a tractor steering apparatus of the class described, the combination of a center pole, a control cable extending therefrom and having enlarged portions thereon in spaced relation to each other corresponding to circular rows of a field, a cable reel adapted to be mounted on a tractor supporting the opposite end of said control cable, a pivoted steering arm parallel to a portion of said control cable and at substantially right angles to said cable extending away from said apparatus toward said pole having a pulley at its movable end engaging said control cable, a pair of electrical switches in opposed relation to each other engaging opposite sides of said pivoted arm, spring means exerting force on said arm opposed to said pole, a reversible steering motor in circuit with said pair of switches adapted to be operatively connected with conventional steering gear of a tractor, a motor operatively connected with said cable reel, radially disposed switch means in connection with said center pole electrically connected with said motor for energizing the same at each complete turn of said tractor about said field for reeling in said control cable, and switch means engageable with said enlarged portions of said control cable for stopping the reeling in operation of said motor in connection with said control cable reel.

2. In a tractor steering apparatus of the class described, the combination of a center pole, a control cable extending therefrom and having enlarged portions thereon in spaced relation to each other corresponding to circular rows of a field, a cable reel adapted to be mounted on a tractor supporting the opposite end of said control cable, a pivoted steering arm parallel to a portion of said control cable and at substantially right angles to said cable extending away from said apparatus toward said pole having a pulley at its movable end engaging said control cable, a pair of electrical switches in opposed relation to each other engaging opposite sides of said pivoted arm, spring means exerting force on said arm opposed to said pole, a reversible steering motor in circuit with said pair of switches adapted to be operatively connected with conventional steering gear of a tractor, a motor operatively connected with said cable reel, radially disposed switch means in connection with said center pole electrically connected with said motor for energizing the same at each complete turn of said tractor about said field for reeling in said control cable, switch means engageable with said enlarged portions of said control cable for stopping the reeling in operation of said motor in connection with said control cable reel, said radially extending switch means in connection with said center pole including an extending overhead jog wire, and an electrically conducting aerial adapted to be connected with the tractor engageable with said jog wire for completing the circuit to said motor in connection with said cable reel.

3. In a tractor steering apparatus of the class described, the combination of a center pole, a control cable extending therefrom and having enlarged portions thereon in spaced relation to each other corresponding to circular rows of a field, a cable reel adapted to be mounted on a tractor supporting the opposite end of said control cable, a pivoted steering arm parallel to a portion of said control cable and at substantially right angles to said cable extending away from said apparatus toward said pole having a pulley at its movable end engaging said control cable, a pair of electrical switches in opposed relation to each other engaging opposite sides of said pivoted arm, a reversible steering motor in circuit with said pair of switches adapted to be operatively connected with conventional steering gear of a tractor, a motor operatively connected with said cable reel, radially disposed switch means in connection with said center pole electrically connected with said motor for energizing the same at each complete turn of said tractor about said field for reeling in said control cable, switch means engageable with said enlarged portions of said control cable for stopping the reeling in operation of said motor in connection with said control cable reel, and a tension spring in connection with said pivoted arm tending to force said pivoted arm away from said center pole.

4. In a tractor steering apparatus of the class described, the combination of a center pole, a control cable extending therefrom and having enlarged portions thereon in spaced relation to each other corresponding to circular rows of a field, a cable reel adapted to be mounted on a tractor supporting the opposite end of said control cable, a pivoted steering arm parallel to a portion of said control cable and at substantially right angles to said cable extending away from said apparatus toward said pole having a pulley at its movable end engaging said control cable, a pair of electrical switches in opposed relation to each other engaging opposite sides of said pivoted arm, a reversible steering motor in circuit with said pair of switches adapted to be operatively connected with conventional steering gear of a tractor, a motor operatively connected with said cable reel, radially disposed switch means in connection with said center pole electrically connected with said motor for energizing the same at each complete turn of said tractor about said field for reeling in said control cable, switch means engageable with said enlarged portions of said control cable for stopping the reeling in operation of said motor in connection with said control cable reel, a tension spring in connection with said pivoted arm tending to force said pivoted arm away from said center pole, and a snubber in connection with said pivoted arm for dampening the action of said spring.

5. In a tractor steering apparatus of the class described, the combination of a center pole, a control cable extending therefrom and having enlarged portions thereon in spaced relation to each other corresponding to circular rows of a field, a cable reel adapted to be mounted on a tractor supporting the opposite end of said control cable, a pivoted steering arm parallel to a portion of said control cable and at substantially right angles to said cable extending away from said apparatus toward said pole having a pulley at its movable end engaging said control cable, a pair of electrical switches in opposed relation to each other engaging opposite sides of said pivoted arm, spring means exerting force on said arm opposed to said pole, a reversible steering motor in circuit with said pair of switches adapted to be operatively connected with conventional steering gear of a tractor, a motor operatively connected with said cable reel, radially disposed switch means in connection with said center pole electrically connected with said motor for energizing the same at each complete turn of said tractor about said field for reeling in said control cable, switch means engageable with said enlarged portions of said control cable for stopping the reeling in operation of said motor in connection with said control cable reel, and a pulley outboard of said pulley on said pivoted arm engageable with said control cable and a switch having a roller contact arm engaging said control cable outwardly of the last mentioned pulley adapted to be connected in circuit with the ignition system of a tractor engine.

6. In a tractor steering apparatus of the class described, the combination of a center pole, a control cable extending therefrom and having enlarged portions thereon in spaced relation to each other corresponding to circular rows of a field, a cable reel adapted to be mounted on a tractor supporting the opposite end of said control cable, a pivoted steering arm parallel to a portion of said control cable and at substantially right angles to said cable extending away from said apparatus toward said pole having a pulley at its movable end engaging said control cable, a pair of electrical switches in opposed relation to each other engaging opposite sides of said pivoted arm, spring means exerting force on said arm opposed to said pole, a reversible steering motor in circuit with said pair of switches adapted to be operatively connected with conventional steering gear of a tractor, a pivoted, spring loaded pawl engageable with enlarged portions of said control cable, cam means in connection with said pivoted spring loaded pawl, and a pair of opposed switches operatively engageable with said cam means, electrically connected with said motor of said cable reel for operating the same in different directions in accordance with the position of said pawl and the enlarged portion of said control cable in engagement therewith.

7. In a tractor steering apparatus of the class described, the combination of a center pole, a control cable extending therefrom and having enlarged portions thereon in spaced relation to each other corresponding to circular rows of a field, a cable reel adapted to be mounted on a tractor supporting the opposite end of said control cable, a pivoted steering arm parallel to a portion of said control cable and at substantially right angles to said cable extending away from said apparatus toward said pole having a pulley at its movable end engaging said control cable, a pair of electrical switches in opposed relation to each other engaging opposite sides of said pivoted arm, spring means exerting force on said arm opposed to said pole, a reversible steering motor in circuit with said pair of switches adapted to be operatively connected with conventional steering gear of a tractor, a pivoted spring loaded pawl engageable with enlarged portions of said control cable, cam means in connection with said pivoted spring loaded pawl, a pair of opposed switches operatively engageable with said cam means, electrically connected with said motor of said cable reel for operating the same in different directions in accordance with the position of said pawl and the enlarged portion of said control cable in engagement therewith, a jog wire connected to said center pole overhead of said tractor, an outfield pole supporting the opposite end of said jog wire, an aerial adapted to be secured to a tractor and engageable with said jog wire, said jog wire and said control cable being electrically connected at said center pole and grounded to said tractor, a relay electrically connected with said aerial adapted to be energized when said aerial contacts said jog wire, contact means in connection with said relay for closing the circuit to the motor in connection with said cable reel for operating the same in a direction causing the cable to be wound thereon, contacts in connection with said relay for opening the circuit to the contactor of said motor connected with said cable reel, and a third switch engageable with said cam means and in circuit with said relay for deenergizing the same when the enlarged portion of said cable passes said spring loaded pawl.

8. In a tractor steering apparatus of the class described, the combination of a center pole, a control cable extending therefrom and having enlarged portions thereon in spaced relation to each other corresponding to circular rows of a field, a cable reel adapted to be mounted on a tractor supporting the opposite end of said control cable, a pivoted steering arm parallel to a portion of said control cable and at substantially right angles to said cable extending away from said apparatus toward said pole having a pulley at its movable end engaging said control cable, a pair of electrical switches in opposed relation to each other engaging opposite sides of said pivoted arm, spring means exerting force on said arm opposed to said pole, a reversible steering motor in circuit with said pair of switches adapted to be operatively connected with conventional steering gear of a tractor, a motor operatively connected with said cable reel, radially disposed switch means in connection with said center pole electrically connected with said motor for energizing the same at each complete turn of said tractor about said field for reeling in said control cable, switch means engageable with said enlarged portions of said control cable for stopping the reeling in operation of said motor in connection with said control cable reel, an electrical conductor in connection with said center pole, a slip ring thereon in connection with said control cable, a jog wire connected with said center pole to said electrical conductor and extending radially therefrom, a second pole supporting the opposite end of said jog wire, and an aerial adapted to be connected with a tractor for engaging said jog wire for initiating operation of the motor in connection with said cable reel.

9. In a tractor steering apparatus of the class described, a center pole, a control cable connected with said center pole and insulated electrically therefrom, said center pole provided with an electrical conductor and a sleeve revolubly mounted thereon to which said control cable is connected, a contact on said revolubly mounted sleeve, a second contact in fixed relation with said center pole in the path of said first mentioned contact, said first mentioned contact electrically connected with said control cable, said electrical conductor of said center pole electrically connected with the ground and a conductor extending therefrom in the ground and radially disposed relatively to said center pole.

10. In a tractor steering apparatus of the class described, the combination of a center pole, a control cable extending therefrom and having enlarged portions thereon in spaced relation to each other corresponding to circular rows of a field, a cable reel adapted to be mounted on a tractor supporting the opposite end of said control cable, a pivoted steering arm parallel to a portion of said control cable and at substantially right angles to said cable extending away from said apparatus toward said pole having a pulley at its movable end engaging said control cable, a pair of electrical switches in opposed relation to each other engaging opposite sides of said pivoted arm, spring means exerting force on said arm opposed to said pole, a reversible steering motor in circuit with said pair of switches adapted to be operatively connected with conventional steering gear of a tractor, a motor operatively connected with said cable reel, radially disposed switch means in connection with said center pole electrically connected with said motor for energizing the same at each complete turn of said tractor about said field for reeling in said control cable, switch means engageable with said enlarged portions of said control cable for stopping the reeling in operation of said motor in connection with said control cable reel, said radially extending switch means in connection with said center pole including an extending overhead jog wire, an electrically conducting aerial adapted to be connected with the tractor engageable with said jog wire for completing the circuit to said motor in connection with said cable reel, and a magnetic brake in connection with said cable reel and said motor in connection therewith automatically set when said motor is in static position.

11. In a tractor steering apparatus of the class described, the combination of a center pole, a control cable extending therefrom and having enlarged portions thereon in spaced relation to each other corresponding to circular rows of a field, a cable reel adapted to be mounted on a tractor supporting the opposite end of said control cable, a pivoted steering arm parallel to a portion of said control cable and at substantially right angles to said cable extending away from said apparatus toward said pole having a pulley at its movable end engaging said control cable, a pair of electrical switches in opposed relation to each other engaging opposite sides of said pivoted arm, spring means exerting force on said arm opposed to said pole, a reversible steering motor in circuit with said pair of switches adapted to be operatively connected with conventional steering gear of a tractor, a motor operatively connected with said cable reel, radially disposed switch means in connection with said center pole electrically connected with said motor for energizing the same at each complete turn of said tractor about said field for reeling in said control cable, switch means engageable with said enlarged portions of said control cable for stopping the reeling in operation of said motor in connection with said control cable reel, a relay in circuit with said steering motor and said motor in connection with said cable reel, safety switches connected in series with said relay adapted to be opened and cause said relay to be de-energized, contacts operatively connected with said relay adapted to be electrically connected with a tractor engine ignition coil for supplying current thereto, and signal means having contacts operatively associated with said relay, whereby the opening of one of said safety switches causes said ignition coil to be de-energized and causes said signal means to operate.

12. In a tractor steering apparatus of the class described, the combination of a center pole, a control cable extending therefrom and having enlarged portions thereon in spaced relation to each other corresponding to circular rows of a field, a cable reel adapted to be mounted on a tractor supporting the opposite end of said control cable, a pivoted steering arm parallel to a portion of said control cable and at substantially right angles to said cable extending away from said apparatus toward said pole having a pulley at its movable end engaging said control cable, a pair of electrical switches in opposed relation to each other engaging opposite sides of said pivoted arm, spring means exerting force on said arm opposed to said pole, a reversible steering motor in circuit with said pair of switches adapted to be operatively connected with conventional steering gear of a tractor, a motor operatively connected with said cable reel, radially disposed switch means in connection with said center pole electrically connected with said motor for energizing the same at each complete turn of said tractor about said field for reeling in said control cable, switch means engageable with said enlarged portions of said control cable for stopping the reeling in operation of said motor in connection with said control cable reel, a relay in circuit with said steering motor and said motor in connection with said cable reel, safety switches connected in series with said relay, adapted to be opened and cause said relay to be de-energized, contacts operatively connected with said relay adapted to be electrically connected with a tractor engine control means for stopping operation of said tractor engine when one of said safety switches is opened.

13. In a tractor steering apparatus of the class described, the combination of a center pole, a control cable extending therefrom and having enlarged portions thereon in spaced relation to each other corresponding to circular rows of a field, a cable reel adapted to be mounted on a tractor supporting the opposite end of said control cable, a pivoted steering arm parallel to a portion of said control cable and at substantially right angles to said cable extending away from said apparatus toward said pole having a pulley at its movable end engaging said control cable, a pair of electrical switches in opposed relation to each other engaging opposite sides of said pivoted arm, spring means exerting force on said arm opposed to said pole, a reversible steering motor in circuit with said pair of switches adapted to be operatively connected with conventional steering gear of a tractor, a pivoted spring loaded pawl engageable with enlarged portions of said control cable, cam means in connection with said pivoted spring loaded pawl, a pair of opposed switches operatively engageable with said cam means, electrically connected with said motor of said cable reel for operating the same in different directions in accordance with the position of said pawl and enlarged portion of said control cable in engagement therewith, a jog wire connected to said center pole overhead of said tractor, an outfield pole supporting the opposite end of said jog wire, an aerial adapted to be secured to a tractor and engageable with said jog wire, said jog wire and said control cable being electrically connected at said center pole and grounded to said tractor, a relay electrically connected with said aerial adapted to be energized when said aerial contacts said jog wire, contact means in connection with said relay for closing the circuit to the motor in connection with said cable reel for operating the same in a direction causing the cable to be wound thereon, contacts in connection with said relay for opening the circuit to the contactor of said motor connected with said cable reel, a third switch engageable with said cam means and in circuit with said relay for de-energizing the same when the enlarged portion of said cable passes said spring loaded pawl, and a heater switch in circuit with the said third switch and the tractor engine, operating means for stopping operation of the tractor engine after the heater switch has been energized for a predetermined length of time.

14. In a tractor steering apparatus of the class described, the combination of a field center pole, a radially extending control cable connected with said field center pole and having spaced enlarged portions corresponding to spaced curved rows of a field about said field center pole, control means including an intermittently operated cable reel on which the opposite end of said cable from said pole is wound, and switch means operated by said enlarged portions on said cable at each circumferential cycle of said apparatus around said pole adapted to be connected with a tractor for jogging the path of a tractor in accordance with the spaced relation of said enlarged portions.

ARLIE D. HILL.

REFERENCES CITED

The following references are of record in the file of this patent:

UNITED STATES PATENTS

| Number | Name | Date |
|---|---|---|
| 1,537,183 | O'Hara | May 12, 1925 |
| 1,690,761 | Washburn | Nov. 6, 1928 |
| 2,259,193 | Andrew | Oct. 14, 1941 |